US012580695B2

(12) United States Patent
Zhang et al.

(10) Patent No.: US 12,580,695 B2
(45) Date of Patent: Mar. 17, 2026

(54) FEEDBACK INFORMATION TRANSMITTING METHOD AND APPARATUS, AND DEVICE AND STORAGE MEDIUM

(71) Applicant: GUANGDONG OPPO MOBILE TELECOMMUNICATIONS CORP., LTD., Dongguan (CN)

(72) Inventors: Shichang Zhang, Dongguan (CN); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 309 days.

(21) Appl. No.: 18/349,462

(22) Filed: Jul. 10, 2023

(65) Prior Publication Data

US 2023/0353293 A1 Nov. 2, 2023

Related U.S. Application Data

(63) Continuation of application No. PCT/CN2021/071780, filed on Jan. 14, 2021.

(51) Int. Cl.
| | |
|---|---|
| *H04L 1/1867* | (2023.01) |
| *H04W 4/06* | (2009.01) |
| *H04W 72/1273* | (2023.01) |
| *H04W 72/20* | (2023.01) |
| *H04W 72/30* | (2023.01) |

(52) U.S. Cl.
CPC ............. *H04L 1/1893* (2013.01); *H04W 4/06* (2013.01); *H04W 72/1273* (2013.01); *H04W 72/20* (2023.01); *H04W 72/30* (2023.01)

(58) Field of Classification Search
CPC .... H04L 1/1893; H04W 72/20; H04W 72/30; H04W 72/1273; H04W 4/06
See application file for complete search history.

(56) References Cited

U.S. PATENT DOCUMENTS

| | | | | |
|---|---|---|---|---|
| 2020/0106566 A1* | 4/2020 | Yeo | ...................... | H04L 1/1812 |
| 2020/0112941 A1* | 4/2020 | Yerramalli | ............ | H04W 72/30 |
| 2021/0243782 A1* | 8/2021 | Miao | ..................... | H04L 5/0091 |
| 2022/0086824 A1* | 3/2022 | Kundu | ................... | H04B 1/713 |

(Continued)

FOREIGN PATENT DOCUMENTS

| | | |
|---|---|---|
| CN | 111884766 | 11/2020 |
| EP | 3618321 A1 | 3/2020 |
| WO | 2014109568 | 7/2014 |

OTHER PUBLICATIONS

Oppo, "PUCCH resource allocation for UL feedback in MBMS," 3GPP TSG RAN WG1 #103-e, R1-2008245, Oct. 2020.

(Continued)

*Primary Examiner* — Melanie Jagannathan
(74) *Attorney, Agent, or Firm* — Hodgson Russ LLP

(57) ABSTRACT

A feedback information sending method includes: a terminal receives configuration signaling sent by a network device, the configuration signaling being used for configuring at least one PUCCH type of feedback information sent by the terminal; and the terminal determines at least one PUCCH resource on the basis of the at least one PUCCH type, and sends the feedback information to the network device by means of the at least one PUCCH resource.

19 Claims, 5 Drawing Sheets

(56) References Cited

U.S. PATENT DOCUMENTS

| | | | | |
|---|---|---|---|---|
| 2022/0086883 A1* | 3/2022 | Liu | H04W 72/54 | |
| 2022/0183032 A1* | 6/2022 | Papasakellariou | H04L 1/1861 | |
| 2022/0322292 A1* | 10/2022 | Takeda | H04W 72/20 | |
| 2023/0049784 A1* | 2/2023 | Lee | H04W 72/23 | |
| 2023/0180269 A1* | 6/2023 | Li | H04W 72/11 | 370/312 |
| 2023/0232430 A1* | 7/2023 | Zhou | H04L 12/1868 | 370/312 |
| 2023/0276458 A1* | 8/2023 | Lee | H04W 72/232 | 370/329 |
| 2024/0032012 A1* | 1/2024 | Wang | H04W 4/06 | |

OTHER PUBLICATIONS

Huawei, "FL summary#2 on improving reliability for MBS for RRC_Connected UEs," 3GPP TSG RAN WG1 Meeting #103-e, R1-2009539, Oct. 2020.
"3rd Generation Partnership Project; Technical Specification Group Radio Access Network; NR; Physical layer procedures for control (Release 16)," 3GPP TS 38.213, Sep. 2020, v16.3.0.
"3rd Generation Partnership Project; Technical Specification Group Radio Access Network; NR; Radio Resource Control (RRC) protocol specification (Release 16)," 3GPP TS 38.331, Sep. 2020, v16.2.0.
"3rd Generation Partnership Project; Technical Specification Group Radio Access Network; NR; Physical channels and modulation (Release 16)," 3GPP TS 38.211, Sep. 2020, v16.3.0.
"RAN1 Chairman's Notes," 3GPP TSG RAN WG1 Meeting #103-e, Oct. 2020.
WIPO, International Search Report and Written Opinion for PCT/CN2021/071780, Oct. 15, 2021.
CMCC, "Summary#1 on mechanisms to support group scheduling for RRC_Connected UEs for NR MBS," 3GPP TSG RAN WG1 #103-e, R1-2009629, Oct. 2020.
CATT, "Discussion on reliability improvement mechanism for RRC_Connected UEs in MBS," 3GPP TSG RAN WG1 #103-e, R1-2007836, Oct. 2020.
EPO, Extended European Search Report for EP Application No. 21918371.2, Sep. 29, 2023.
EPO, Communication for EP Application No. 21918371.2, Jul. 5, 2024.

* cited by examiner

Selected type of PUCCH resources

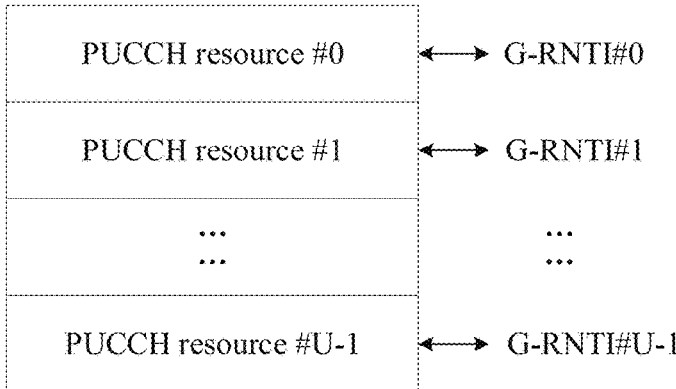

FIG. 3

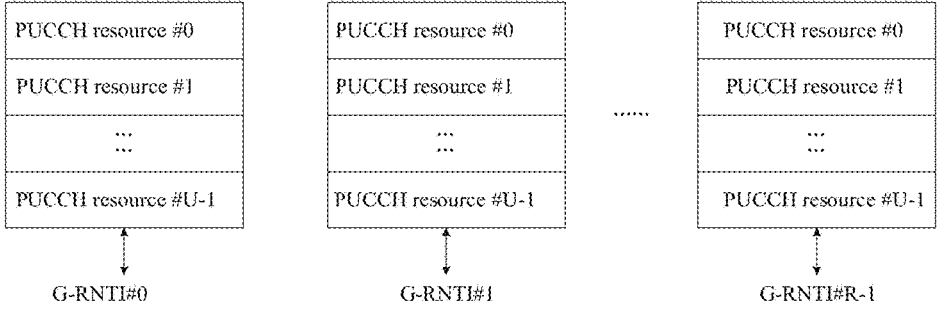

FIG. 4

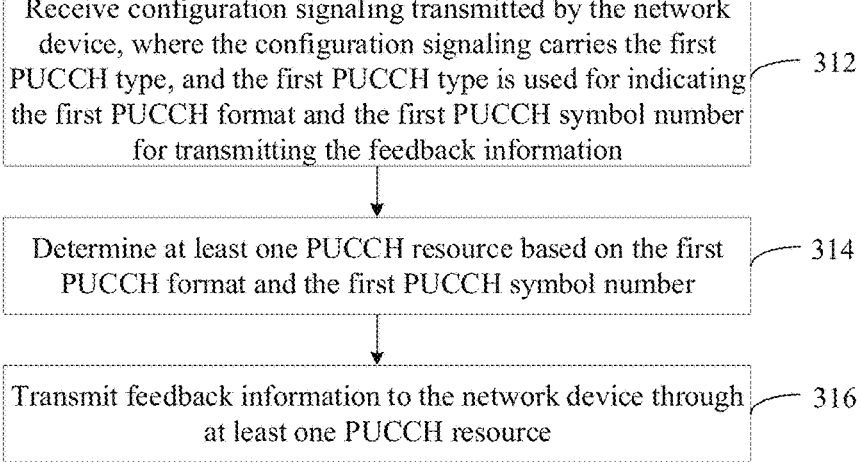

Receive configuration signaling transmitted by the network device, where the configuration signaling carries the first PUCCH type, and the first PUCCH type is used for indicating the first PUCCH format and the first PUCCH symbol number for transmitting the feedback information — 312

Determine at least one PUCCH resource based on the first PUCCH format and the first PUCCH symbol number — 314

Transmit feedback information to the network device through at least one PUCCH resource — 316

FIG. 5

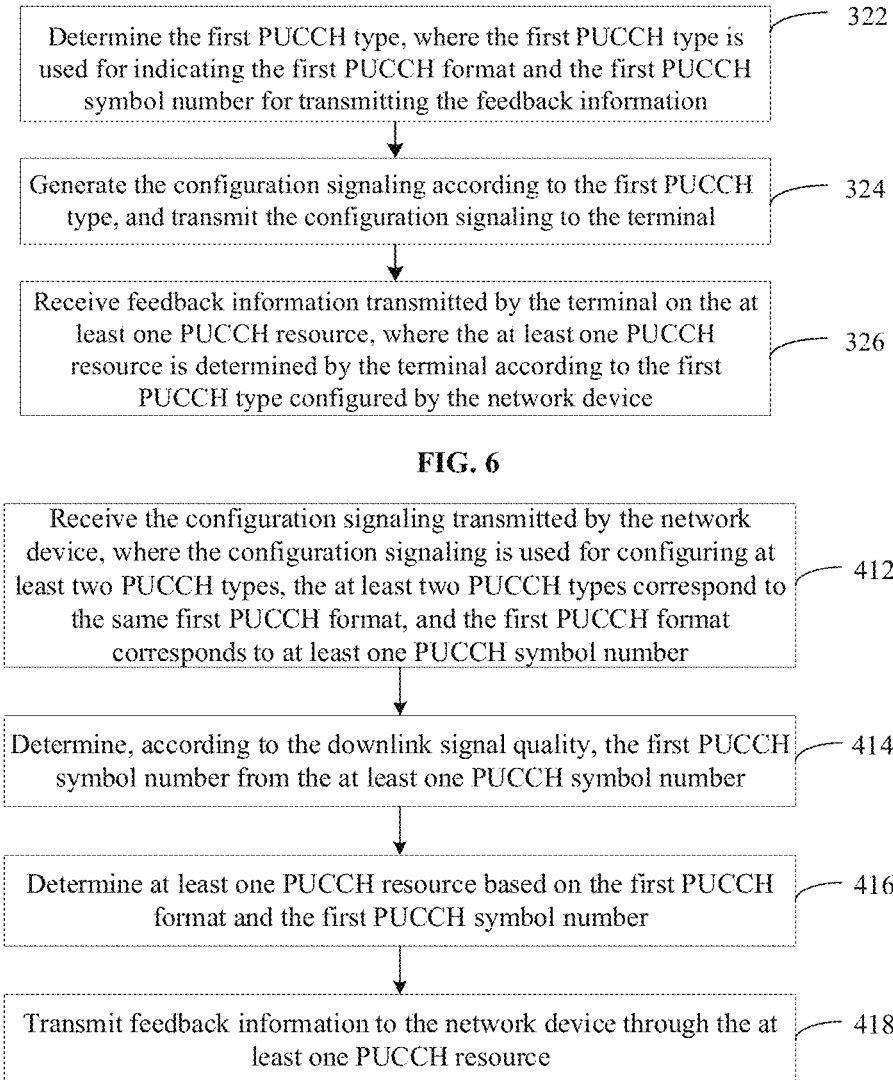

Determine the first PUCCH type, where the first PUCCH type is used for indicating the first PUCCH format and the first PUCCH symbol number for transmitting the feedback information ⟋— 322

Generate the configuration signaling according to the first PUCCH type, and transmit the configuration signaling to the terminal ⟋— 324

Receive feedback information transmitted by the terminal on the at least one PUCCH resource, where the at least one PUCCH resource is determined by the terminal according to the first PUCCH type configured by the network device ⟋— 326

FIG. 6

Receive the configuration signaling transmitted by the network device, where the configuration signaling is used for configuring at least two PUCCH types, the at least two PUCCH types correspond to the same first PUCCH format, and the first PUCCH format corresponds to at least one PUCCH symbol number ⟋— 412

Determine, according to the downlink signal quality, the first PUCCH symbol number from the at least one PUCCH symbol number ⟋— 414

Determine at least one PUCCH resource based on the first PUCCH format and the first PUCCH symbol number ⟋— 416

Transmit feedback information to the network device through the at least one PUCCH resource ⟋— 418

FIG. 7

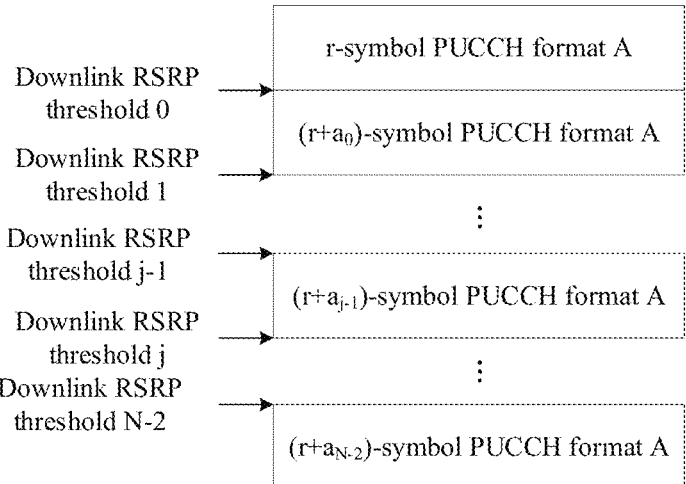

Downlink RSRP threshold 0 → r-symbol PUCCH format A

Downlink RSRP threshold 1 → $(r+a_0)$-symbol PUCCH format A

⋮

Downlink RSRP threshold j-1 →

Downlink RSRP threshold j → $(r+a_{j-1})$-symbol PUCCH format A

Downlink RSRP threshold N-2 → ⋮

$(r+a_{N-2})$-symbol PUCCH format A

FIG. 8

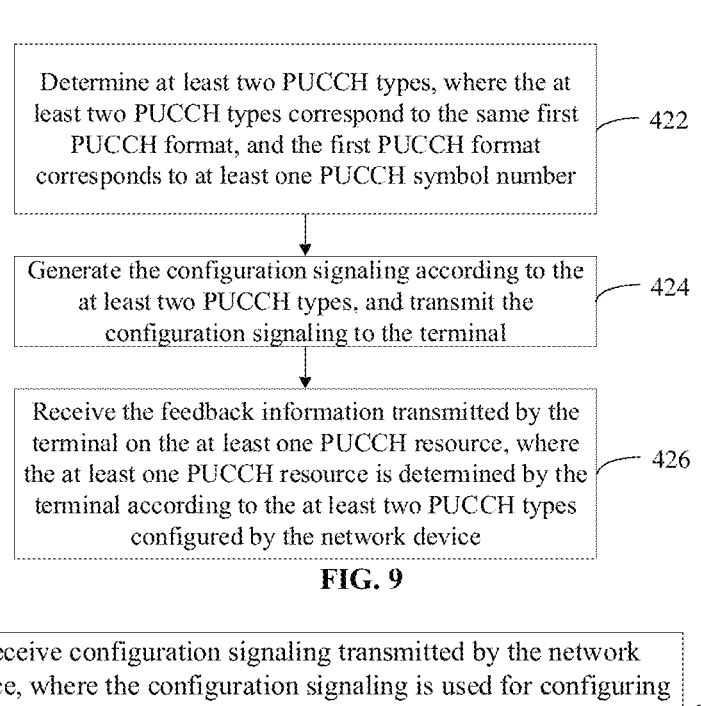

Determine at least two PUCCH types, where the at least two PUCCH types correspond to the same first PUCCH format, and the first PUCCH format corresponds to at least one PUCCH symbol number — 422

Generate the configuration signaling according to the at least two PUCCH types, and transmit the configuration signaling to the terminal — 424

Receive the feedback information transmitted by the terminal on the at least one PUCCH resource, where the at least one PUCCH resource is determined by the terminal according to the at least two PUCCH types configured by the network device — 426

FIG. 9

Receive configuration signaling transmitted by the network device, where the configuration signaling is used for configuring at least two PUCCH types — 512

Determine that the downlink signal quality is greater than i_min and less than i_max and, accordingly, determine, from at least two PUCCH types, a first PUCCH type corresponding to the i-th value range, where the first PUCCH type includes the first PUCCH format and the first PUCCH symbol number — 514

Determine at least one PUCCH resource based on the first PUCCH format and the first PUCCH symbol number — 516

Transmit the feedback information to the network device through the at least one PUCCH resource — 518

FIG. 10

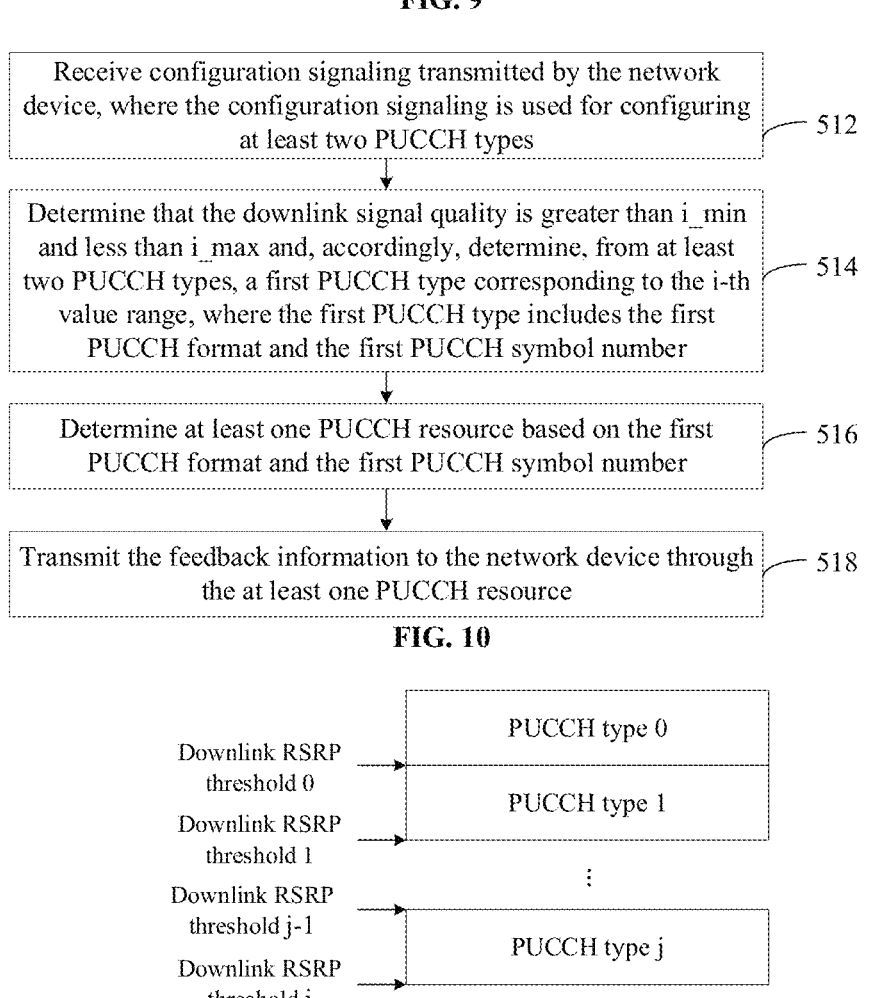

PUCCH type 0

Downlink RSRP threshold 0

PUCCH type 1

Downlink RSRP threshold 1

Downlink RSRP threshold j-1

PUCCH type j

Downlink RSRP threshold j

Downlink RSRP threshold N-2

PUCCH type N-2

FIG. 11

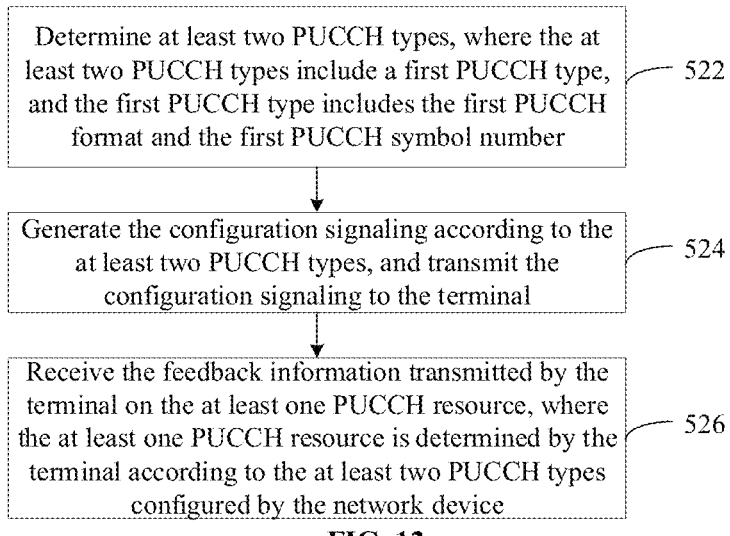

Determine at least two PUCCH types, where the at least two PUCCH types include a first PUCCH type, and the first PUCCH type includes the first PUCCH format and the first PUCCH symbol number    ⟋ 522

Generate the configuration signaling according to the at least two PUCCH types, and transmit the configuration signaling to the terminal    ⟋ 524

Receive the feedback information transmitted by the terminal on the at least one PUCCH resource, where the at least one PUCCH resource is determined by the terminal according to the at least two PUCCH types configured by the network device    ⟋ 526

FIG. 12

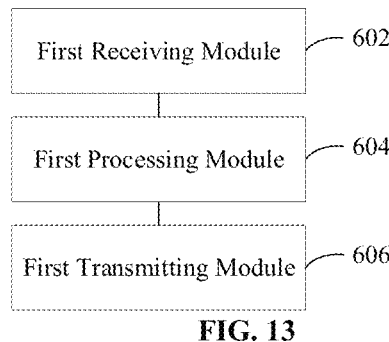

First Receiving Module    ⟋ 602

First Processing Module    ⟋ 604

First Transmitting Module    ⟋ 606

FIG. 13

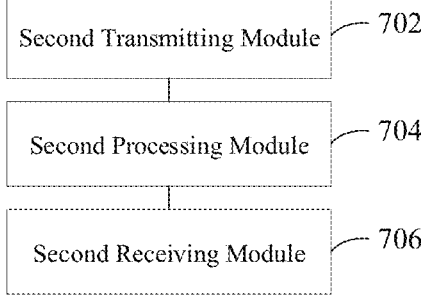

Second Transmitting Module    ⟋ 702

Second Processing Module    ⟋ 704

Second Receiving Module    ⟋ 706

FIG. 14

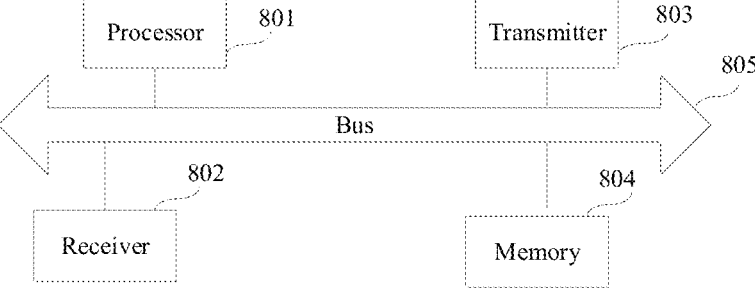

Processor   801

Transmitter   803

805

Bus

802

804

Receiver

Memory

FIG. 15

FEEDBACK INFORMATION TRANSMITTING METHOD AND APPARATUS, AND DEVICE AND STORAGE MEDIUM

CROSS-REFERENCE TO RELATED APPLICATION

This application is a continuation of International Application No. PCT/CN2021/071780, filed Jan. 14, 2021, the entire disclosure of which is incorporated herein by reference.

TECHNICAL FIELD

This application relates to the field of communications, and in particular, to a method, an apparatus, a device for transmitting feedback information and a storage medium.

BACKGROUND

Multimedia broadcast multicast service (MBMS) is a technology that transmits data from one data source to multiple user equipment (UE) by sharing network resources.

In order to ensure the transmission reliability of MBMS, two types of feedback mechanisms are introduced for multicast or broadcast. The first type is the manner of only feeding back non-acknowledgement information (NACK). The network device transmits multicast data to UE. When the UE successfully receives the multicast data or broadcast data transmitted by the network device, the UE does not feed back acknowledgment information (ACK). When the UE fails to receive the multicast data or broadcast data transmitted by the network device, the UE feeds back NACK. The second type is the manner of feeding back both ACK and NACK. When the UE successfully receives the multicast data transmitted by the network device, the UE feeds back ACK; otherwise the UE feeds back NACK.

SUMMARY

Embodiments of this application provide a method, an apparatus, a device for transmitting feedback information and a storage medium. The technical solution is as follows.

According to an aspect of embodiments of this application, a method for transmitting feedback information is provided, applied to a hybrid automatic repeat request (HARQ) information feedback scenario where non-acknowledgment information (NACK) is present in broadcast or multicast, and includes:

receiving, by a terminal, a configuration signaling transmitted by a network device, where the configuration signaling is used for configuring at least one physical uplink control channel (PUCCH) type for the terminal to transmit the feedback information; and determining, by the terminal, at least one PUCCH resource based on the at least one PUCCH type, and transmitting the feedback information to the network device through the at least one PUCCH resource.

According to another aspect of embodiments of this application, a method for transmitting feedback information is provided, applied to an HARQ information feedback scenario where NACK is present in broadcast or multicast, and includes:

transmitting, by a network device, a configuration signaling to a terminal, where the configuration signaling is used for configuring at least one PUCCH type for the terminal to transmit the feedback information, the at least one PUCCH type is used for determining at least one PUCCH resource, and the at least one PUCCH resource is used for carrying the feedback information transmitted by the terminal to the network device.

According to another aspect of embodiments of this application, an apparatus for transmitting feedback information is provided, applied to an HARQ information feedback scenario where NACK is present in broadcast or multicast, and includes:

a first receiving module, configured to receive a configuration signaling transmitted by a network device, where the configuration signaling is used for configuring at least one PUCCH type for a terminal to transmit the feedback information;

a first processing module, configured to determine at least one PUCCH resource based on the at least one PUCCH type, and a first transmitting module, configured to transmit the feedback information to the network device through the at least one PUCCH resource.

According to another aspect of embodiments of this application, an apparatus for transmitting feedback information is provided, applied to an HARQ information feedback scenario where NACK is present in broadcast or multicast, and includes:

a second transmitting module, configured to transmit a configuration signaling to a terminal, where the configuration signaling is used for configuring at least one PUCCH type for the terminal to transmit the feedback information, the at least one PUCCH type is used for determining at least one PUCCH resource, and the at least one PUCCH resource is used for carrying the feedback information transmitted by the terminal to the network device.

According to another aspect of embodiments of this application, a terminal is provided and includes:

a processor; and a transceiver coupled to the processor, where the processor is configured to load and execute executable instructions, thereby implementing the method for transmitting feedback information according to various aspects as described above.

According to another aspect of embodiments of this application, a network device is provided and includes:

a processor; and a transceiver coupled to the processor, where the processor is configured to load and execute executable instructions, thereby implementing the method for transmitting feedback information according to various aspects as described above.

According to another aspect of embodiments of this application, a computer-readable storage medium is provided and stores at least one instruction, or at least one piece of program, code set or instruction set, where the at least one instruction, or the at least one piece of program, code set or instruction set is loaded and executed by a processor to implement the method for transmitting feedback information according to various aspects as described above.

The technical solutions provided by the embodiments of this application may include the following beneficial effects.

A manner of HARQ information feedback during broadcast and multicast in the new radio (NR) MBMS system. The network device configures the PUCCH type for the terminal, and the terminal determines, based on the PUCCH type, at least one PUCCH resource used for feeding back one or more pieces of feedback information. Accordingly, the terminal in different network coverage environments can effectively feed back HARQ acknowledgment information ACK or NACK with respect to broadcast and multicast, thereby improving the accurate transmission performance of broadcast and multicast data.

It is to be understood that the foregoing general description and the following detailed description are exemplary and explanatory only and are not limiting of this application.

BRIEF DESCRIPTION OF THE DRAWINGS

In order to illustrate the technical solutions in the embodiments of this application more clearly, the following briefly introduces the drawings that are used in the description of the embodiments. Obviously, the drawings in the following description are only some embodiments of this application. For those of ordinary skill in the art, other drawings can also be obtained from these drawings without creative effort.

FIG. 3 is a schematic diagram showing the correspondence between PUCCH resources and group-radio network temporary identifiers (G-RNTIs) according to some embodiments.

FIG. 4 is a schematic diagram showing the correspondence between PUCCH resource sets and G-RNTIs according to some embodiments.

FIG. 5 is a flowchart of a method for transmitting feedback information according to some other embodiments.

FIG. 6 is a flowchart of a method for transmitting feedback information according to some other embodiments.

FIG. 7 is a flowchart of a method for transmitting feedback information according to some other embodiments.

FIG. 8 is a schematic diagram showing the correspondence between the numbers of PUCCH symbols and reference signal receiving power (RSRP) values according to some embodiments.

FIG. 9 is a flowchart of a method for transmitting feedback information according to some other embodiments.

FIG. 10 is a flowchart of a method for transmitting feedback information according to some other embodiments.

FIG. 11 is a schematic diagram showing the correspondence between PUCCH types and RSRP values according to some embodiments.

FIG. 12 is a flowchart of a method for transmitting feedback information according to some other embodiments.

FIG. 13 is a block diagram of an apparatus for transmitting feedback information according to some embodiments.

FIG. 14 is a block diagram of an apparatus for transmitting feedback information according to some other embodiments.

FIG. 15 is a schematic structural diagram of a terminal according to some embodiments.

DETAILED DESCRIPTION

Exemplary embodiments will be described in detail herein, examples of which are illustrated in the accompanying drawings. Where the following description refers to the drawings, the same numerals in different drawings refer to the same or similar elements unless otherwise indicated. The embodiments described in the illustrative examples below are not intended to represent all embodiments consistent with this application. Rather, they are merely examples of apparatus and methods consistent with some aspects of this application as recited in the appended claims.

In the NR MBMS system, if broadcast and multicast support the feedback mode of only NACK feedback, since cellular communication has high requirements on coverage, what kind of physical channel should be used for carrying one or more HARQ feedback bits while ensuring coverage, there is currently no solution.

Figure 1:
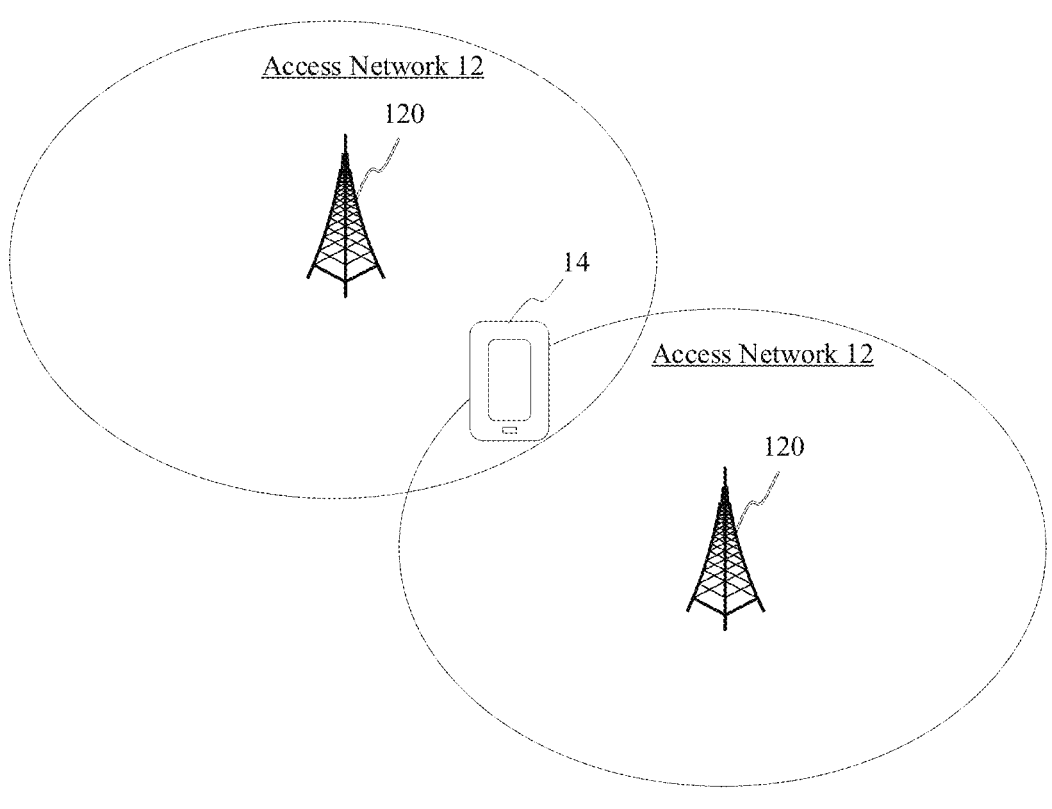
FIG. 1 is a block diagram of a communication system according to some embodiments.

FIG. 1 shows a block diagram of a communication system according to some embodiments of this application. The communication system may include an access network 12 and a terminal device 14.

The access network 12 includes several network devices 120. The network device 120 may be a base station, which is a device deployed in the access network 12 to provide a wireless communication function for the terminal device 14. The base station may include various forms such as macro base station, micro base station, relay station, access point and so on. In systems using different radio access technologies (RATs), the names of devices with the function of base station may be different. For example, in the long term evolution (LTE) system, it is called eNodeB or eNB; in the NR-based access to unlicensed spectrum (NR-U) system, it is called gNodeB or gNB. As communication technology evolves, the description of "base station" may vary. For the convenience of describing the embodiments of this application, the above-mentioned devices for providing the wireless communication function for the terminal device 14 are collectively referred to as the network device.

The terminal device 14 may include various devices with wireless communication functions, such as handheld devices, vehicle-mounted devices, wearable devices, computing devices or other processing devices connected to wireless modems, as well as various forms of user equipment, mobile station (MS), terminal device, and the like. For the convenience of description, the devices mentioned above are collectively referred to as terminals. The network device 120 and the terminal device 14 communicate with each other through a certain air interface technology, such as a Uu interface.

The technical solutions of the embodiments of this application may be applied to various communication systems, such as Global System of Mobile Communication (GSM) system, Code Division Multiple Access (CDMA) system, Wideband Code Division Multiple Access (WCDMA) system, General Packet Radio Service (GPRS), LTE system, LTE Frequency Division Duplex (FDD) system, LTE Time Division Duplex (TDD) system, Advanced Long Term Evolution (LTE-A) system, NR system, evolution system of NR system, LTE-based access to Unlicensed spectrum (LTE-U) system, NR-U system, Universal Mobile Telecommunication System (UMTS), Worldwide Interoperability for Microwave Access (WiMAX) communication system, Wireless Local Area Networks (WLAN), Wireless Fidelity (Wireless Fidelity, WiFi), next-generation communication systems or other communication systems.

Generally speaking, traditional communication systems support a limited number of connections and are easy to be implemented. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, Vehicle to Everything (V2X) system, and the like.

Embodiments of this application may also be applied to these communication systems.

As to the HARQ information feedback scenario where NACK is present in broadcast or multicast, the above scenario may include at least one of the following.

There is an HARQ information feedback scenario where only NACK is fed back. Accordingly, the HARQ feedback manner where only NACK is fed back is called NACK-only feedback.

There is also an HARQ information feedback scenario where ACK or NACK is fed back.

Figure 2:
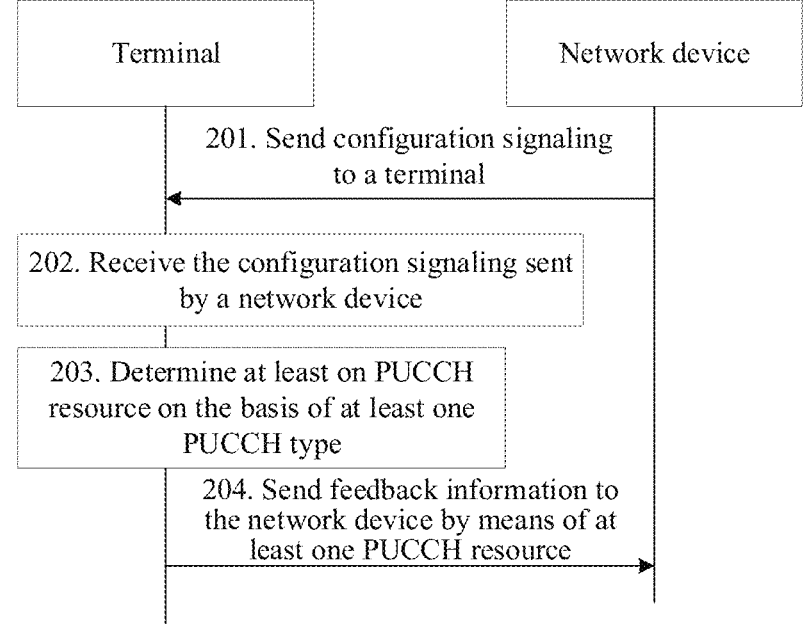
FIG. 2 is a flowchart of a method for transmitting feedback information according to some embodiments.

FIG. 2 shows a flowchart of a method for transmitting feedback information according to some embodiments of this application, which is applied to the HARQ information feedback scenario where NACK is present in broadcast or multicast in the communication system shown in FIG. 3. From the perspective of interaction between terminals and network devices, the method includes following content.

In step 201, the network device transmits configuration signaling to the terminal.

The network device determines at least one PUCCH type, generates the configuration signaling based on the at least one PUCCH type, and transmits the configuration signaling to the terminal. The configuration signaling is used for configuring the at least one PUCCH type for the terminal transmits feedback information, the at least one PUCCH type is used for determining at least one PUCCH resource, and the at least one PUCCH resource is used for carrying the feedback information transmitted by the terminal to the network device.

Optionally, the configuration signaling may include at least one of the following signaling: a broadcast message, a system information block (SIB), a radio resource control (RRC) message, an RRC reconfiguration signaling, downlink control information (DCI), a medium access control (MAC) control element (CE), a physical downlink control channel (PDCCH) order, data information.

In step 202, the terminal receives the configuration signaling transmitted by the network device.

In step 203, the terminal determines the at least one PUCCH resource based on the at least one PUCCH type.

For a PUCCH type, the terminal may be configured with M PUCCH resources, where M is a positive integer. Exemplarily, the above-mentioned M PUCCH resources may be configured for the terminal by the network device through the configuration signaling. Optionally, if M is a positive integer greater than 1, there are at least two PUCCH resources, in the M PUCCH resources, that are the same or different in at least one signal dimension, where the signal dimension includes time domain, frequency domain and code domain.

Optionally, the terminal configures at least two PUCCH resources for the first PUCCH type, and each PUCCH resource corresponds to a different G-RNTI. Exemplarily, the at least two PUCCH resources may be the same or different PUCCH resources. As shown in FIG. 3, the first PUCCH type (i.e., the selected type) is configured with U PUCCH resources, which are PUCCH resource #0, PUCCH resource #1, . . . , PUCCH resource #U−1, respectively, and the U PUCCH resources correspond to U G-RNTIs one by one. For example, PUCCH resource #0 corresponds to G-RNTI #0, PUCCH resource #1 corresponds to G-RNTI #1, . . . , and PUCCH resource #U−1 corresponds to G-RNTI #U−1, where U is a positive integer greater than 1.

Exemplarily, the terminal is configured with at least one G-RNTI, the terminal selects the first PUCCH type from at least one PUCCH type configured by the network device, and determines, from at least two PUCCH resources configured for the first PUCCH type, at least one PUCCH resource corresponding to the at least one G-RNTI.

Optionally, at least two PUCCH resource sets are configured for the terminal with respect to the first PUCCH type, and each PUCCH resource set corresponds to a different G-RNTI. As shown in FIG. 4, the first PUCCH type is configured with R PUCCH resource sets, which are PUCCH resource set #0, PUCCH resource set #1, . . . , PUCCH resource set #R−1, respectively, and each PUCCH resource set includes U PUCCH resources, which are PUCCH resource #0, PUCCH resource #1, . . . , PUCCH resource #U−1, respectively. The R PUCCH resource sets are in one-to-one correspondence with R G-RNTIs. For example, PUCCH resource set #0 corresponds to G-RNTI RNTI #0, PUCCH resource set #1 corresponds to G-RNTI #1, . . . , PUCCH resource set #R−1 corresponds to G−RNTI #R−1, where R is a positive integer greater than 1.

Exemplarily, the above PUCCH resource set includes U identical PUCCH resources, or the above PUCCH resource set includes U different PUCCH resources, or the above PUCCH resource set includes at least two different PUCCH resources.

Exemplarily, the terminal is configured with at least one G-RNTI, and the terminal selects the first PUCCH type from at least one PUCCH type configured by the network device, determines, from at least two PUCCH resource sets configured for the first PUCCH type, at least one PUCCH resource set corresponding to at least one G-RNTI, and then determines at least one PUCCH resource from the at least one PUCCH resource set.

Optionally, the above-mentioned G-RNTI is configured for the terminal by the network device through configuration signaling; or, the above-mentioned G-RNTI is defined by a communication standard.

In step 204, the terminal transmits feedback information to the network device through at least one PUCCH resource.

The terminal determines, on the at least one PUCCH resource, a transmission slot for transmitting the feedback information, and transmits the HARQ feedback information to the network device through the transmission slot.

To sum up, the method for transmitting feedback information according to some embodiments provides a manner for HARQ information feedback during broadcast and multicast in the New Radio (NR) MBMS system. The network device configures the PUCCH type for the terminal, and the terminal determines, based on the PUCCH type, at least one PUCCH resource used for feeding back one or more pieces of feedback information. Accordingly, the terminal in different network coverage environments can effectively feed back HARQ acknowledgment information ACK or NACK with respect to broadcast and multicast, thereby improving the accurate transmission performance of broadcast and multicast data.

It should be noted that, the above steps at the terminal side may be implemented independently as one embodiment, and the above steps at the network device side may be implemented independently as another embodiment.

There are different PUCCH type configuration manners in this application. For example, one PUCCH type may be configured by the network device; or, at least two PUCCH types may be configured by the network device, and the terminal may select one PUCCH type therefrom.

For the first configuration mode, FIG. 5 shows a flowchart of a method for transmitting feedback information according to some embodiments of this application, which is applied to the HARQ information feedback scenario where NACK is present in broadcast or multicast in the communication system shown in FIG. 3. From the perspective of terminal, the method includes following content.

In step 312, the terminal receives the configuration signaling transmitted by the network device, where the configuration signaling carries the first PUCCH type, and the first PUCCH type is used for indicating the first PUCCH format and the first PUCCH symbol number for transmitting the feedback information.

The configuration information received by the terminal is used for configuring the first PUCCH type. Exemplarily, the terminal obtains the first PUCCH format and the first PUCCH symbol number of the first PUCCH type from the configuration signaling. Alternatively, the terminal obtains the first PUCCH type from the configuration signaling, and determines the first PUCCH format and the first PUCCH symbol number defined in the communication standard.

Optionally, the above configuration signaling may include at least one of the following signaling: broadcast message, SIB, RRC message, RRC reconfiguration signaling, DCI, MAC CE, PDCCH order, and data information.

Optionally, the foregoing first PUCCH format includes one of PUCCH format 0, PUCCH format 1, PUCCH format 2, PUCCH format 3, and PUCCH format 4. The first PUCCH symbol number is related to the first PUCCH format, for example, if it is PUCCH format 0, the PUCCH symbol number may be 1 or 2.

In step 314, the terminal determines at least one PUCCH resource based on the first PUCCH format and the first PUCCH symbol number.

Optionally, a terminal is configured with at least one G-RNTI. The terminal determines at least one candidate PUCCH resource that supports the first PUCCH format and the first PUCCH symbol number; and determines, from the at least one candidate PUCCH resource, the at least one PUCCH resource corresponding to the G-RNTI.

In step 316, the terminal transmits feedback information to the network device through at least one PUCCH resource.

Exemplarily, the terminal receives the configuration signaling from the network device, and determines a PUCCH format used for the NACK-only feedback according to the configuration signaling, where the PUCCH format may be PUCCH format 0 or PUCCH format 1. In an MBMS scheduled by G-RNTI, in which the NACK-only feedback is adopted, the terminal transmits HARQ feedback information by using the PUCCH format configured for the NACK-only feedback.

Exemplarily, a terminal is configured with at least one G-RNTI, where the G-RNTI is used for scrambling the PDCCH that schedules the physical downlink shared channel (PDSCH) carrying MBMS transmission, and for each G-RNTI A corresponding PUCCH type for NACK-only feedback may be configured. Exemplarily, there are at least two G-RNTIs corresponding to different PUCCH types for the NACK-only feedback.

Correspondingly, as shown in FIG. 6, from the perspective of network device, the method includes following content.

In step 322, the network device determines the first PUCCH type, where the first PUCCH type is used for indicating the first PUCCH format and the first PUCCH symbol number for transmitting the feedback information.

The network device determines the first PUCCH type for the terminal to transmit the feedback information. Optionally, the first PUCCH type includes the first PUCCH format and the first PUCCH symbol number. Exemplarily, a PUCCH format and a PUCCH symbol number corresponding to a PUCCH type are defined by the communication standard, and the network device determines the first PUCCH format and the first PUCCH symbol number corresponding to the first PUCCH type defined by the communication standard.

Optionally, the foregoing PUCCH format includes one of PUCCH format 0, PUCCH format 1, PUCCH format 2, PUCCH format 3, and PUCCH format 4. The PUCCH symbol number is related to the PUCCH format, for example, if it is PUCCH format 0, the PUCCH symbol number may be 1 or 2.

Optionally, the network device receives the downlink signal quality reported by the terminal, and determines the first PUCCH type according to the downlink signal quality.

Optionally, the above-mentioned downlink signal quality may be obtained by that the terminal reports the downlink signal quality according to the indication of the network device, or the terminal periodically reports the downlink signal quality to the network device.

Optionally, the above-mentioned downlink signal quality includes at least one of RSRP, Reference Signal Receiving Quality (RSRQ), and Signal to Interference plus Noise Ratio (SINR). Optionally, RSRP may further include at least one of synchronization signal RSRP (SS-RSRP) or channel status indicator RSRP (CSI-RSRP).

After receiving the downlink signal quality, the network device determines the first PUCCH type according to the downlink signal quality. Exemplarily, the network device is configured with N consecutive value ranges of downlink signal quality, where each value range corresponds to a respective PUCCH type, and each PUCCH type corresponds to a respective PUCCH format and a respective PUCCH symbol number. In some embodiments, the i-th value range is [i_min, i_max), that is, greater than or equal to i_min and less than i_max. In response to determining that the downlink signal quality is greater than or equal to equal to i_min and less than i_max, the network device determines the PUCCH type corresponding to the i-th value range as the first PUCCH type.

Alternatively, the i-th value range may also be (i_min, i_max], that is, greater than i_min and less than or equal to i_max. In response to determining that the downlink signal quality is greater than i_min and less than or equal to i_max, the network device determines the PUCCH type corresponding to the i-th value range as the first PUCCH type.

Optionally, the network device is configured with a signal quality threshold, and when the downlink signal quality is greater than or equal to the signal quality threshold, the network device may determine that the PUCCH resource used by the terminal for NACK-only feedback is configured as PUCCH format 0. When downlink signal quality is less than the signal quality threshold, the network device may determine that the PUCCH resource used by the terminal for NACK-only feedback is configured as PUCCH format 1. In other words, for the PUCCH resource used for NACK-only feedback, when the network device determines that the downlink signal quality is greater than or equal to the signal quality threshold, the first PUCCH format indicated by the first PUCCH type is PUCCH format 0; when the downlink signal quality is less than the signal quality threshold, the first PUCCH format indicated by the first PUCCH type is PUCCH format 1.

It should be noted that the above downlink signal quality may also be referred to as downlink channel quality.

In step 324, the network device generates the configuration signaling according to the first PUCCH type, and transmits the configuration signaling to the terminal.

The network device generates, according to the first PUCCH type, the configuration signaling that carries the first PUCCH format and the first PUCCH symbol number, or generates, according to the first PUCCH type, the configuration signaling that does not carry the first PUCCH format and the first PUCCH symbol number; and then transmits the configuration signaling to the terminal.

In step 326, the network device receives feedback information transmitted by the terminal on the at least one PUCCH resource, where the at least one PUCCH resource is determined by the terminal according to the first PUCCH type configured by the network device.

To sum up, in the method for transmitting feedback information according to some embodiments, the network device can configure a corresponding PUCCH type according to the downlink signal quality reported by the terminal, thereby ensuring effective reporting of HARQ feedback information.

For the second configuration mode, FIG. 7 shows a flowchart of a method for transmitting feedback information according to some embodiments of this application, which is applied to the HARQ information feedback scenario where NACK is present in broadcast or multicast in the communication system shown in FIG. 3. From the perspective of terminal, the method includes following content.

In step 412, the terminal receives the configuration signaling transmitted by the network device, where the configuration signaling is used for configuring at least two PUCCH types, the at least two PUCCH types correspond to the same first PUCCH format, and the first PUCCH format corresponds to at least one PUCCH symbol number.

Optionally, the above-mentioned first PUCCH format is configured by the network device through configuration signaling; or, the first PUCCH format is defined by a communication standard.

Exemplarily, the above configuration signaling is used for configuring at least two PUCCH types for NACK-only feedback, and the at least two PUCCH types correspond to the same PUCCH format, for example, PUCCH format 0 or PUCCH format 1.

The terminal determines the first PUCCH symbol number corresponding to the first PUCCH format based on the configuration signaling, which may be implemented by means of step 414.

In step 414, the terminal determines, according to the downlink signal quality, the first PUCCH symbol number from the at least one PUCCH symbol number.

The terminal is configured with N consecutive value ranges of downlink signal quality, with each value range corresponding to a respective PUCCH symbol number. In some embodiments, the i-th value range is [i_min, i_max), that is, greater than or equal to i_min and less than i_max. In response to determining that the downlink signal quality is greater than or equal to i_min and less than i_max, the terminal determines the PUCCH symbol number corresponding to the i-th value range as the first PUCCH symbol number.

Alternatively, the i-th value range is (i_min, i_max], that is, greater than i_min and less than or equal to i_max. In response to determining that the downlink signal quality is greater than i_min and less than or equal to i_max, the terminal determines the PUCCH symbol number corresponding to the i-th value range as the first PUCCH symbol number. Herein, N, i_min, and i_max are all positive integers, and i_min is smaller than i_max.

Optionally, the above-mentioned N value ranges of downlink signal quality for selecting the PUCCH symbol number are configured by the network device for the terminal through configuration signaling.

Exemplarily, as shown in FIG. 8, the downlink signal quality is RSRP as an example, the above N value ranges include N−1 downlink RSRP thresholds, which are respectively downlink RSRP threshold 0, downlink RSRP threshold 1, . . . , downlink RSRP threshold N−2, where the values of the above downlink RSRP thresholds decrease sequentially. The N−1 downlink RSRP thresholds divide the RSRP values into N value ranges. If the downlink RSRP measured by the terminal is greater than or equal to the downlink RSRP threshold 0, then the terminal determines to transmit the HARQ feedback information by using the PUCCH format A of r symbols. If the downlink RSRP measured by the terminal is greater than or equal to the downlink RSRP threshold 1 and less than the downlink RSRP threshold 0, the terminal determines to transmit the HARQ feedback information by using the PUCCH format A of $r+a_0$ symbols; and so on. If the downlink RSRP measured by the terminal is greater than or equal to the downlink RSRP threshold j and less than the downlink RSRP threshold j−1, the terminal determines to transmit HARQ feedback information by using the PUCCH format A of $r+a_{j-1}$ symbols, where j is a positive integer, and j−1 is less than or equal to N−2. Exemplarily, the foregoing PUCCH format A includes one of PUCCH format 0, PUCCH format 1, PUCCH format 2, PUCCH format 3, and PUCCH format 4. For different PUCCH formats, the value of r may be different. For example, if PUCCH format A is PUCCH format 0, the value of r may be 0; if PUCCH format A is PUCCH format 1, the value of r may be 4. $a_{j-1}$ is a positive integer, and the value of $a_{j-1}$ may be configured for the terminal by the network device through configuration signaling, or may be defined in a communication standard.

Optionally, the terminal is configured with at least two G-RNTIs, with each G-RNTI corresponding to N value ranges of downlink signal quality. In other words, each G-RNTI may correspond to at least one downlink signal quality threshold (i.e., the signal quality threshold), where the at least one downlink signal quality threshold divides values of the downlink signal quality into N value ranges. Exemplarily, the values of N corresponding to at least two G-RNTIs are the same or different. Optionally, at least one downlink signal quality threshold corresponding to at least two G-RNTIs are different; exemplarily, each downlink signal quality threshold in the at least one downlink signal quality threshold may be different, or, some downlink signal quality thresholds thereof may be different.

In step 416, the terminal determines at least one PUCCH resource based on the first PUCCH format and the first PUCCH symbol number.

In step 418, the terminal transmits feedback information to the network device through the at least one PUCCH resource.

Correspondingly, as shown in FIG. 9, from the perspective of network device, the method includes following content.

In step 422, the network device determines at least two PUCCH types, where the at least two PUCCH types correspond to the same first PUCCH format, and the first PUCCH format corresponds to at least one PUCCH symbol number.

In step 424, the network device generates the configuration signaling according to the at least two PUCCH types, and transmits the configuration signaling to the terminal.

The configuration signaling is used for configuring the terminal with the at least two PUCCH types carrying the feedback information.

In step 426, the network device receives the feedback information transmitted by the terminal on the at least one PUCCH resource, where the at least one PUCCH resource is determined by the terminal according to the at least two PUCCH types configured by the network device.

To sum up, based on the method for transmitting feedback information according to some embodiments, the terminal selects the PUCCH type for transmitting HARQ feedback information according to the downlink signal quality, thereby reducing the reporting of the downlink signal quality and saving the transmission power of the terminal.

For the second configuration mode, FIG. 10 shows a flowchart of a method for transmitting feedback information according to some other embodiments of this application, which is applied to any of the forgoing HARQ information feedback scenario where NACK is present in broadcast or multicast in the communication system shown in FIG. 3. From the perspective of terminal, the method includes following content.

In step 512, the terminal receives configuration signaling transmitted by the network device, where the configuration signaling is used for configuring at least two PUCCH types.

The terminal is configured with N consecutive value ranges of downlink signal quality, with each value range corresponding to a respective PUCCH type, where the i-th value range is [i_min, i_max), that is, greater than or equal to i_min and less than i_max, or the i-th value range is (i_min, i_max], that is, greater than i_min and less than or equal to i_max.

In step 514, the terminal determines that the downlink signal quality is greater than i_min and less than i_max and, accordingly, determines, from at least two PUCCH types, a first PUCCH type corresponding to the i-th value range, where the first PUCCH type includes the first PUCCH format and the first PUCCH symbol number.

The terminal determines that the downlink signal quality is greater than or equal to i_min and less than i_max, and determines, from at least two PUCCH types, the first PUCCH type corresponding to the i-th value range. Alternatively, the terminal determines that the downlink signal quality is greater than i_min and less than or equal to i_max, and determines, from at least two PUCCH types, the first PUCCH type corresponding to the i-th value range. In some embodiments, each PUCCH type configured by the network device includes a PUCCH format and a PUCCH symbol number. Herein, N, i, i_min, and i_max are all positive integers, and i_min is smaller than i_max.

Optionally, the above-mentioned N value ranges of the downlink signal quality for selecting the PUCCH type are configured by the network device for the terminal through configuration signaling.

Optionally, there are at least two PUCCH types corresponding to the same or different PUCCH formats.

Exemplarily, as shown in FIG. 11, the downlink signal quality is RSRP as an example, the above N value ranges include N−1 downlink RSRP thresholds, which are respectively downlink RSRP threshold 0, downlink RSRP threshold 1, . . . , downlink RSRP threshold N−2, with the values of the above downlink RSRP thresholds decreasing in turn. The N−1 downlink RSRP thresholds divide the RSRP values into N value ranges. If the downlink RSRP measured by the terminal is greater than or equal to the downlink RSRP threshold 0, the terminal determines to transmit HARQ feedback information by using PUCCH type 0. If the downlink RSRP measured by the terminal is greater than or equal to downlink RSRP threshold 1 and less than downlink RSRP threshold 0, the terminal determines to transmit HARQ feedback information by using PUCCH type 1; and so on. If the downlink RSRP measured by the terminal is greater than or equal to the downlink RSRP threshold j and less than the downlink RSRP threshold j−1, the terminal determines to transmit the HARQ feedback information by using PUCCH type j, where j is a positive integer, and j−1 is less than or equal to N−2.

For example, the terminal determines 4 PUCCH types according to the configuration signaling from the network device, which are 1-symbol PUCCH format 0, 2-symbol PUCCH format 0, 4-symbol PUCCH format 1, and M-symbol PUCCH format 1, respectively, where M is greater than 4 and less than or equal to 14. The terminal further determines 3 downlink RSRP thresholds corresponding to the above 4 PUCCH types according to the configuration signaling from the network device, which are respectively downlink RSRP threshold 0, downlink RSRP threshold 1 and downlink RSRP Threshold 2. If the downlink RSRP measured by the terminal is greater than or equal to the downlink RSRP threshold 0, the terminal transmits the feedback information of NACK-only feedback by using the 1-symbol PUCCH format 0. If the downlink RSRP measured by the terminal is greater than or equal to the downlink RSRP threshold 1 and less than the downlink RSRP threshold 0, the terminal transmits the feedback information of NACK-only feedback by using the 2-symbol PUCCH format 0. If the downlink RSRP measured by the terminal is greater than or equal to the downlink RSRP threshold 2 and less than the downlink RSRP threshold 1, the terminal transmits the feedback information of NACK-only feedback by using the 4-symbol PUCCH format 1. If the downlink RSRP measured by the terminal is less than the downlink RSRP threshold 2, the terminal transmits the feedback information of NACK-only feedback by using the M-symbol PUCCH format 1.

For another example, the terminal determines two PUCCH types according to the configuration signaling from the network device, which are 1-/2-symbol PUCCH format 0, and 4-/M-symbol PUCCH format 1, where M is greater than 4 and less than or equal to 14. The terminal further determines, according to the configuration signaling from the network device, a downlink RSRP threshold corresponding to the above two PUCCH types, which is the downlink RSRP threshold 0. If the downlink RSRP measured by the terminal is greater than or equal to the downlink RSRP threshold 0, the terminal transmits the feedback information of NACK-only feedback by using the 1-/2-symbol PUCCH format 0. If the downlink RSRP measured by the terminal is less than the downlink RSRP threshold 0, the terminal transmits the feedback information of NACK-only feedback by using the 4-/M-symbol PUCCH format 1.

Exemplarily, the above PUCCH format j includes one of PUCCH format 0, PUCCH format 1, PUCCH format 2, PUCCH format 3, and PUCCH format 4.

Exemplarily, the terminal receives the configuration signaling from the network device, and determines the PUCCH type used for NACK-only feedback according to the configuration signaling. For any MBMS scheduled by G-RNTI where NACK-only feedback is applied, the terminal may be configured with at least two PUCCH types for NACK-only feedback used for transmitting the HARQ feedback information.

Exemplarily, there are at least two G-RNTIs corresponding to different PUCCH types for the NACK-only feedback.

Optionally, the terminal is configured with at least two G-RNTIs, with each G-RNTI corresponding to N value ranges of downlink signal quality. In other words, each G-RNTI may correspond to at least one downlink signal quality threshold (i.e., signal quality threshold), where the at least one downlink signal quality threshold divides values of the downlink signal quality into N value ranges. Exemplarily, the values of N corresponding to at least two G-RNTIs are the same or different. Optionally, the at least one downlink signal quality threshold corresponding to the at least two G-RNTIs is different; exemplarily, each downlink signal quality threshold in the at least one downlink signal quality threshold may be different, or, some downlink signal quality thresholds thereof may be different.

In step 516, the terminal determines at least one PUCCH resource based on the first PUCCH format and the first PUCCH symbol number.

In step 518, the terminal transmits the feedback information to the network device through the at least one PUCCH resource.

Correspondingly, as shown in FIG. 12, from the perspective of network device, the method includes following content.

In step 522, the network device determines at least two PUCCH types, where the at least two PUCCH types include a first PUCCH type, and the first PUCCH type includes the first PUCCH format and the first PUCCH symbol number.

In step 524, the network device generates the configuration signaling according to the at least two PUCCH types, and transmits the configuration signaling to the terminal.

In step 526, the network device receives the feedback information transmitted by the terminal on the at least one PUCCH resource, where the at least one PUCCH resource is determined by the terminal according to the at least two PUCCH types configured by the network device.

To sum up, based on the method for transmitting feedback information according to some embodiments, the terminal selects the PUCCH type for transmitting HARQ feedback information according to the downlink signal quality, thereby reducing the reporting of the downlink signal quality and saving the transmission power of the terminal.

It should be noted that if a G-RNTI is associated with a PUCCH resource set for NACK-only feedback or a PUCCH resource for NACK-only feedback, the G-RNTI may be called a NACK-only G-RNTI.

In some embodiments, for transmitting the feedback information, the terminal first determines, on at least one PUCCH resource, a transmission slot for transmitting the feedback information, and then transmits the feedback information to the network device through the transmission slot.

For the determination of the above transmission slot, the terminal detects, in slot n, a PDSCH scheduled by a PDCCH scrambled by G-RNTI, and determines slot n+k as the transmission slot for transmitting feedback information, where k is indicated by the PDCCH scheduling the PDSCH, and n, k are positive integers.

The terminal detects, in slot n, a release of semi-persistent scheduling (SPS) indicated by the PDCCH scrambled by G-RNTI, and determines slot n+k as the transmission slot for transmitting feedback information, where k is indicated by the PDCCH indicating the release of SPS, and n, k are positive integers. Subsequently, the terminal transmits the feedback information of at least one G-RNTI to the network device in the transmission slot.

Optionally, the above-mentioned G-RNTI includes a NACK-only G-RNTI. The terminal detects, in slot n, the PDSCH scheduled by the PDCCH scrambled by the NACK-only G-RNTI, and determines slot n+k as the transmission slot for transmitting HARQ feedback information with respect to the above-mentioned PDSCH. The terminal detects, in slot n, the release of SPS indicated by the PDCCH scrambled by NACK-only G-RNTI, and determines slot n+k as the transmission slot for transmitting HARQ feedback information with respect to the above release of SPS.

It should also be noted that the detection of PDCCH (or PDSCH) in slot n means that the last symbol of the PDCCH (or PDSCH) is located in the subframe n. For PDSCH, if only one TB is carried, the HARQ feedback information of the PDSCH includes 1 bit; if 2 TBs are carried, the feedback information of the PDSCH includes 2 bits. If the terminal successfully decodes a certain TB, a HARQ feedback bit corresponding to this TB is ACK, that is, the bit value is 1; otherwise, the bit value is 0.

In one slot, the terminal may only feed back 1-bit HARQ feedback information for one NACK-only G-RNTI. If the terminal needs to feed back M-bit HARQ feedback information for the same NACK-only G-RNTI in slot u where the PUCCH used for NACK-only feedback is located, $1 \leq M$, and if one of the M bits is 0, the terminal transmits the PUCCH of PUCCH format 0 in the PUCCH resource for NACK-only feedback corresponding to the NACK-only G-RNTI; otherwise, the terminal does not transmit any information.

Alternatively, M-bit HARQ feedback information are fed back for one G-RNTI in one slot, with different feedback information using different PUCCH resources, where $1 \leq M$.

For example, the PUCCH type determined by the terminal is 4-symbol PUCCH format 1, each G-RNTI of NACK-only feedback corresponds to a PUCCH resource set, each PUCCH resource set includes two PUCCH resources of this type, and the two PUCCH resources occupy different time-frequency resources. If the terminal needs to transmit 2-bit HARQ feedback information for the NACK-only G-RNTI on slot u, the terminal may transmit the first feedback bit by using the first PUCCH resource, and transmit the second feedback bit by using the second PUCCH resource.

To sum up, the method for transmitting feedback information according to some embodiments provides a manner for HARQ information feedback during broadcast and multicast in the NR MBMS system. The network device configures the PUCCH type for the terminal, and the terminal determines, based on the PUCCH type, at least one PUCCH resource used for feeding back one or more pieces of feedback information. Accordingly, the terminal in different network coverage environments can effectively feed back HARQ acknowledgment information ACK or NACK with respect to broadcast and multicast, thereby improving the accurate transmission performance of broadcast and multicast data.

FIG. 13 shows a block diagram of an apparatus for transmitting feedback information according to some embodiments of this application. The apparatus may be implemented as part or all of a terminal through software, hardware, or a combination thereof. The apparatus is applied to the HARQ information feedback scenario where NACK is present in broadcast or multicast and includes following content.

A first receiving module 602 is configured to receive a configuration signaling transmitted by a network device, where the configuration signaling is used for configuring at least one physical uplink control channel (PUCCH) type for a terminal to transmit the feedback information.

A first processing module 604 is configured to determine at least one PUCCH resource based on the at least one PUCCH type.

A first transmitting module 606 is configured to transmit the feedback information to the network device through the at least one PUCCH resource.

In some embodiments, the configuration signaling is used for configuring a first PUCCH type, the first PUCCH type includes a first PUCCH format and a first PUCCH symbol number.

The first processing module 604 is configured to determine the at least one PUCCH resource according to the first PUCCH format and the first PUCCH symbol number.

In some embodiments, the first transmitting module 606 is configured to report downlink signal quality to the network device, where the downlink signal quality is used for determining the first PUCCH type.

In some embodiments, the configuration signaling is used for configuring at least two PUCCH types, the at least two PUCCH types correspond to a same first PUCCH format, and the first PUCCH format corresponds to at least one PUCCH symbol number.

The first processing module 604 is configured to determine, according to the downlink signal quality, a first PUCCH symbol number from the at least one PUCCH symbol number; and determine the at least one PUCCH resource based on the first PUCCH format and the first PUCCH symbol number.

In some embodiments, the first PUCCH format is configured by the network device through the configuration signaling; or, the first PUCCH format is defined by a communication standard.

In some embodiments, the terminal is configured with N consecutive value ranges of downlink signal quality, each value range corresponds to a respective PUCCH symbol number, an i-th value range is (i_min, i_max).

The first processing module 604 is configured to determine, in response to that the downlink signal quality is greater than i_min and less than i_max, a PUCCH symbol number corresponding to the i-th value range as the first PUCCH symbol number.

Herein, N, i, i_min, and i_max are positive integers, and i_min is smaller than the i_max.

In some embodiments, the configuration signaling is used for configuring at least two PUCCH types, the terminal is configured with N consecutive value ranges of downlink signal quality, each value range corresponds a respective PUCCH type, an i-th value range is (i_min, i_max).

The first processing module 604 is configured to, in response to that the downlink signal quality is greater than i_min and less than i_max, determine, from the at least two PUCCH types, a first PUCCH type corresponding to the i-th value range, where the first PUCCH type includes a first PUCCH format and a first PUCCH symbol number; and determine the at least one PUCCH resource based on the first PUCCH format and the first PUCCH symbol number.

Herein, N, i, i_min, and i_max are positive integers, and i_min is smaller than the i_max.

In some embodiments, there are at least two PUCCH types corresponding to a same PUCCH format or different PUCCH formats.

In some embodiments, the downlink signal quality includes at least one of RSRP, RSRQ, SINR.

In some embodiments, the PUCCH format includes one of PUCCH format 0, PUCCH format 1, PUCCH format 2, PUCCH format 3 or PUCCH format 4.

In some embodiments, the terminal is configured with a G-RNTI.

The first processing module 604 is configured to determine at least one candidate PUCCH resource supporting the first PUCCH format and the first PUCCH symbol number;

and determine, from the at least one candidate PUCCH resource, the at least one PUCCH resource corresponding to the G-RNTI.

In some embodiments, the configuration signaling includes at least one of following signaling: broadcast message, SIB, RRC message, RRC reconfiguration signaling, DCI, MAC CE, PDCCH order, data information.

In some embodiments, the first processing module 604 is configured to determine, on the at least one PUCCH resource, a transmission slot for transmitting the feedback information.

The first transmitting module 606 is configured to transmit the feedback information to the network device through the transmission slot.

In some embodiments, the first processing module 604 is configured to, in response to the terminal detecting, in a slot n, a PDSCH scheduled by a PDCCH scrambled by a G-RNTI, determine a slot n+k as the transmission slot for transmitting the feedback information, where k is indicated by the PDCCH scheduling the PDSCH, and n and k are positive integers.

In some embodiments, the first processing module 604 is configured to, in response to the terminal detecting, in a slot n, a release of SPS indicated by a PDCCH scrambled by a G-RNTI, determine a slot n+k as the transmission slot for transmitting the feedback information, where k is indicated by the PDCCH indicating the release of SPS, and n and k are positive integers.

In some embodiments, the first transmitting module 606 is configured for the terminal to transmit, on the transmission slot, to the network device the feedback information corresponding to at least one G-RNTI.

To sum up, the apparatus for transmitting feedback information according to some embodiments provides a manner for HARQ information feedback during broadcast and multicast in the NR MBMS system. The network device configures the PUCCH type for the terminal, and the terminal determines, based on the PUCCH type, at least one PUCCH resource used for feeding back one or more pieces of feedback information. Accordingly, the terminal in different network coverage environments can effectively feed back HARQ acknowledgment information ACK or NACK with respect to broadcast and multicast, thereby improving the accurate transmission performance of broadcast and multicast data.

FIG. 14 shows a block diagram of an apparatus for transmitting feedback information according to some embodiments of this application. The apparatus may be implemented as part or all of a network device through software, hardware, or a combination thereof. The apparatus is applied to the HARQ information feedback scenario where NACK is present in broadcast or multicast and includes following content.

A second transmitting module 702 is configured to transmit a configuration signaling to a terminal, where the configuration signaling is used for configuring at least one PUCCH type for the terminal to transmit the feedback information, the at least one PUCCH type is used for determining at least one PUCCH resource, and the at least one PUCCH resource is used for carrying the feedback information transmitted by the terminal to the network device.

In some embodiments, the apparatus further includes a second processing module 704.

The second processing module 704 is configured to determine a first PUCCH type, where the first PUCCH type is used for indicating a first PUCCH format and a first PUCCH symbol number for transmitting the feedback information; and generate the configuration signaling according to the first PUCCH type.

The second transmitting module 702 is configured to transmit the configuration signaling to the terminal.

In some embodiments, the apparatus further includes a second receiving module 706.

The second receiving module 706 is configured to receive downlink signal quality reported by the terminal.

The second processing module 704 is configured to determine the first PUCCH type according to the downlink signal quality.

In some embodiments, the downlink signal quality includes at least one of RSRP, RSRQ, or SINR.

In some embodiments, the apparatus further includes a second processing module 704 and the second transmitting module 702.

The second processing module 704 is configured to determine at least two PUCCH types, and generate the configuration signaling according to the at least two PUCCH types.

The second transmitting module 702 is configured to transmit the configuration signaling to the terminal; where the configuration signaling is used for configuring the terminal with the at least two PUCCH types carrying the feedback information, the at least two PUCCH types correspond to a same first PUCCH format, and the first PUCCH format corresponds to at least one PUCCH symbol number.

In some embodiments, the first PUCCH format is configured by the network device through the configuration signaling; or, the first PUCCH format is defined by a communication standard.

In some embodiments, the apparatus further includes a second processing module 704 and the second transmitting module 702.

The second processing module 704 is configured to determine at least two PUCCH types, and generate the configuration signaling according to the at least two PUCCH types.

The second transmitting module 702 is configured to transmit the configuration signaling to the terminal; where the at least two PUCCH types include a first PUCCH type, and the first PUCCH type includes a first PUCCH format and a first PUCCH symbol number.

In some embodiments, the PUCCH format includes one of PUCCH format 0, PUCCH format 1, PUCCH format 2, PUCCH format 3 or PUCCH format 4.

In some embodiments, the configuration signaling includes at least one of following signaling: broadcast message, SIB, RRC message, RRC reconfiguration signaling, DCI, MAC CE, PDCCH order, data information.

To sum up, the apparatus for transmitting feedback information according to some embodiments provides a manner for HARQ information feedback during broadcast and multicast in the NR MBMS system. The network device configures the PUCCH type for the terminal, and the terminal determines, based on the PUCCH type, at least one PUCCH resource used for feeding back one or more pieces of feedback information. Accordingly, the terminal in different network coverage environments can effectively feed back HARQ acknowledgment information ACK or NACK with respect to broadcast and multicast, thereby improving the accurate transmission performance of broadcast and multicast data.

FIG. 15 shows a schematic structural diagram of a terminal according to some embodiments of this application.

The terminal includes a processor 801, a receiver 802, a transmitter 803, a memory 804, and a bus 805.

The processor 801 includes one or more processing cores, and the processor 801 executes various functional applications and information processing by running software programs and modules.

The receiver 802 and the transmitter 803 may be implemented as a communication component, which may be a communication chip.

The memory 804 is connected to the processor 801 through the bus 805.

The memory 804 may be configured to store at least one instruction, and the processor 801 may be configured to execute the at least one instruction to implement the various steps in the above method embodiments.

Additionally, memory 804 may be implemented by any type or combination of volatile or non-volatile storage devices including, but not limited to, magnetic or optical disks, Electrically Erasable Programmable Read Only Memory (EEPROM), Erasable Programmable Read Only Memory (EPROM), Static Random-Access Memory (SRAM), Read Only Memory (ROM), magnetic memory, flash memory, and Programmable Read Only Memory (PROM).

In some embodiments, a non-transitory computer-readable storage medium including instructions, such as a memory including instructions, is also provided, and the instructions may be executed by a processor of a terminal to complete the above-mentioned method for controlling transmit power of direct communication. For example, the non-transitory computer-readable storage medium may be ROM, Random-Access Memory (RAM), Compact Disc Read-Only Memory (CD-ROM), magnetic tape, floppy disk, optical data storage devices, and the like.

A non-transitory computer-readable storage medium is provided, when the instructions in the non-transitory computer storage medium are executed by a processor of a terminal, the terminal is caused to perform the above method for transmitting feedback information.

Some embodiments of this application further provide a network device, where the network device includes a processor and a transceiver connected to the processor; where the processor is configured to load and execute executable instructions to implement the method at the network device side described in the above methods for transmitting feedback information according to various method embodiments.

Some embodiments of this application further provide a computer-readable storage medium, where at least one instruction, or at least one piece of program, code set or instruction set is stored in the computer-readable storage medium, and the at least one instruction, or the at least one piece of program, code set or instruction set is loaded and executed by the processor to implement the method for transmitting feedback information according to various method embodiments.

It should be understood that references herein to "a plurality/multiple" means two or more. The term "and/or", which describes the association relationship of the associated objects, means that there may be three kinds of relationships. For example, A and/or B means that A exists alone, or both A and B exist, or B exists alone. The character "I" generally indicates that the associated objects are in an "or" relationship.

Other embodiments of this application will readily occur to those skilled in the art upon consideration of the specification and practice of the invention disclosed herein. This application is intended to cover any variations, uses or adaptations of this application that follow the general principles of this application and include common knowledge or conventional techniques in the technical field not disclosed in this application. The specification and examples are to be regarded as exemplary only, with the true scope and spirit of the application being indicated by the following claims.

It is to be understood that this application is not limited to the precise structures described above and illustrated in the accompanying drawings, and that various modifications and changes may be made without departing from the scope thereof. The scope of the application is limited only by the appended claims.

What is claimed is:

1. A method for transmitting feedback information, being applied to a hybrid automatic repeat request (HARQ) information feedback scenario where non-acknowledgment information (NACK) is present in broadcast or multicast, and comprising:

receiving, by a terminal, a configuration signaling transmitted by a network device, wherein the configuration signaling is used for configuring at least one physical uplink control channel (PUCCH) type for the terminal to transmit the feedback information; and determining, by the terminal, at least one PUCCH resource based on the at least one PUCCH type, and transmitting the feedback information to the network device through the at least one PUCCH resource, wherein transmitting the feedback information to the network device through the at least one PUCCH resource comprises:

in response to determining that 1-bit feedback information for one NACK-only G-RNTI requires to be fed back, transmitting, when the 1-bit feedback information is 0, the PUCCH of a PUCCH format 0 through the at least one PUCCH resource for NACK-only feedback corresponding to the NACK-only G-RNTI; and transmitting, when the 1-bit feedback information is not 0, nothing by the terminal.

2. The method according to claim 1, wherein the configuration signaling is used for configuring a first PUCCH type, the first PUCCH type comprises a first PUCCH format and a first PUCCH symbol number; and determining, by the terminal, the at least one PUCCH resource based on the at least one PUCCH type comprises:

determining, by the terminal, the at least one PUCCH resource according to the first PUCCH format and the first PUCCH symbol number.

3. The method according to claim 2, wherein the PUCCH format comprises one of PUCCH format 0, PUCCH format 1, PUCCH format 2, PUCCH format 3 or PUCCH format 4.

4. The method according to claim 2, wherein the terminal is configured with a group radio network temporary identifier (G-RNTI);

determining, by the terminal, the at least one PUCCH resource according to the first PUCCH format and the first PUCCH symbol number comprises:

determining, by the terminal, at least one candidate PUCCH resource supporting the first PUCCH format and the first PUCCH symbol number; and determining, from the at least one candidate PUCCH resource, the at least one PUCCH resource corresponding to the G-RNTI.

5. The method according to claim 1, wherein the configuration signaling comprises at least one of following signaling: a broadcast message, a system information block (SIB), a radio resource control (RRC) message, an RRC reconfiguration signaling, downlink control information (DCI).

6. The method according to claim 1, wherein transmitting, by the terminal, the feedback information to the network device through the at least one PUCCH resource comprises:

detecting, by the terminal in a slot n, a physical downlink shared channel (PDSCH) scheduled by a physical downlink control channel (PDCCH) scrambled by a G-RNTI or a release of semi-persistent scheduling (SPS) indicated by a PDCCH scrambled by a G-RNTI, and determining a slot n+k as a transmission slot for transmitting the feedback information, where k is indicated by the PDCCH scheduling the PDSCH, and n and k are positive integers.

7. The method according to claim 6, wherein transmitting, by the terminal, the feedback information to the network device through the transmission slot comprises:

transmitting, by the terminal on the transmission slot, to the network device the feedback information corresponding to at least one G-RNTI.

8. The method according to claim 1, wherein transmitting the feedback information to the network device through the at least one PUCCH resource comprises:

determining a PUCCH format used for NACK-only feedback according to the configuration signaling, wherein the PUCCH format is PUCCH format 0 or PUCCH format 1; and transmitting the feedback information by using the PUCCH format configured for the NACK-only feedback in a multimedia broadcast multicast service (MBMS) scheduled by a G-RNTI, wherein the NACK-only feedback is adopted.

9. A terminal, being applied to a hybrid automatic repeat request (HARQ) information feedback scenario where non-acknowledgment information (NACK) is present in broadcast or multicast, and comprising:

a processor;

a memory configured to store executable instructions; and a transceiver coupled to the processor;

wherein the processor, through loading and executing the executable instructions, is configured to:

receive, via the transceiver, a configuration signaling transmitted by a network device, wherein the configuration signaling is used for configuring at least one physical uplink control channel (PUCCH) type for the terminal to transmit the feedback information;

determine at least one PUCCH resource based on the at least one PUCCH type, and transmit, via the transceiver, the feedback information to the network device through the at least one PUCCH resource, wherein the processor is further configured to:

in response to determining that 1-bit feedback information for one NACK-only G-RNTI requires to be fed back, transmit, when the 1-bit feedback information is 0, the PUCCH of a PUCCH format 0 through the at least one PUCCH resource for NACK-only feedback corresponding to the NACK-only G-RNTI; and transmit, when the 1-bit feedback information is not 0, nothing by the terminal.

10. The terminal according to claim 9, wherein the configuration signaling is used for configuring a first PUCCH type, the first PUCCH type comprises a first PUCCH format and a first PUCCH symbol number; and wherein the processor is configured to determine the at least one PUCCH resource according to the first PUCCH format and the first PUCCH symbol number.

11. The terminal according to claim 10, wherein the PUCCH format comprises one of PUCCH format 0, PUCCH format 1, PUCCH format 2, PUCCH format 3 or PUCCH format 4.

12. The terminal according to claim 10, wherein the terminal is configured with a group radio network temporary identifier (G-RNTI);

wherein the processor is configured to determine at least one candidate PUCCH resource supporting the first PUCCH format and the first PUCCH symbol number; and determine, from the at least one candidate PUCCH resource, the at least one PUCCH resource corresponding to the G-RNTI.

13. The terminal according to claim 9, wherein the configuration signaling comprises at least one of following signaling: a broadcast message, a system information block (SIB), a radio resource control (RRC) message, an RRC reconfiguration signaling, downlink control information (DCI).

14. The terminal according to claim 9, wherein the processor is configured to, in response to detecting, in a slot n, a physical downlink shared channel (PDSCH) scheduled by a physical downlink control channel (PDCCH) scrambled by a G-RNTI, determine a slot n+k as a transmission slot for transmitting the feedback information, where k is indicated by the PDCCH scheduling the PDSCH, and n and k are positive integers.

15. The terminal according to claim 14, wherein the processor is configured to transmit, via the transceiver on the transmission slot, to the network device the feedback information corresponding to at least one G-RNTI.

16. A network device, being applied to an HARQ information feedback scenario where NACK is present in broadcast or multicast, and comprising:

a processor;

a memory configured to store executable instructions; and a transceiver coupled to the processor;

wherein the processor, through loading and executing the executable instructions, is configured to:

transmit, via the transceiver, a configuration signaling to a terminal, wherein the configuration signaling is used for configuring at least one PUCCH type for the terminal to transmit the feedback information, the at least one PUCCH type is used for determining at least one PUCCH resource, and the at least one PUCCH resource is used for carrying the feedback information transmitted by the terminal to the network device; and in response to determining that 1-bit feedback information for one NACK-only G-RNTI requires to be fed back, receive, when the 1-bit feedback information is 0, the PUCCH of a PUCCH format 0 through the at least one PUCCH resource for NACK-only feedback corresponding to the NACK-only G-RNTI; and receive, when the 1-bit feedback information is not 0, nothing from the terminal.

17. The network device according to claim 16, wherein the processor is further configured to:

determine a first PUCCH type, wherein the first PUCCH type is used for indicating a first PUCCH format and a first PUCCH symbol number for transmitting the feedback information; and generate the configuration signaling according to the first PUCCH type.

18. The network device according to claim 17, wherein the PUCCH format comprises one of PUCCH format 0, PUCCH format 1, PUCCH format 2, PUCCH format 3 or PUCCH format 4.

19. The network device according to claim 16, wherein the configuration signaling comprises at least one of following signaling: a broadcast message, an SIB, an RRC message, an RRC reconfiguration signaling, a DCI.

\* \* \* \* \*